United States Patent
Burns et al.

(10) Patent No.: US 10,228,116 B2
(45) Date of Patent: *Mar. 12, 2019

(54) CONDUCTIVE CHAIN FOR TOUCH DIMMING OVERHEAD LIGHTS

(71) Applicant: Palm Coast Imports, LLC, Memphis, TN (US)

(72) Inventors: James P. Burns, Memphis, TN (US); Brendan P. Byrne, Germantown, TN (US)

(73) Assignee: Palm Coast Imports, LLC, Memphis, TN (US)

( * ) Notice: Subject to any disclaimer, the term of this patent is extended or adjusted under 35 U.S.C. 154(b) by 147 days.

This patent is subject to a terminal disclaimer.

(21) Appl. No.: 15/362,149

(22) Filed: Nov. 28, 2016

(65) Prior Publication Data

US 2017/0097148 A1 Apr. 6, 2017

Related U.S. Application Data

(63) Continuation of application No. 14/966,872, filed on Dec. 11, 2015, now Pat. No. 9,506,640.

(Continued)

(51) Int. Cl.
*F21V 23/04* (2006.01)
*H05B 37/02* (2006.01)
(Continued)

(52) U.S. Cl.
CPC ............ *F21V 23/0485* (2013.01); *F21S 8/03* (2013.01); *F21S 8/033* (2013.01); *F21S 8/04* (2013.01);
(Continued)

(58) Field of Classification Search
CPC .............. H05B 37/0227; H05B 39/085; H05B 33/0845; H05B 33/0848; H05B 33/0854;
(Continued)

(56) References Cited

U.S. PATENT DOCUMENTS 4,668,876 A    5/1987   Skarman
4,764,708 A    8/1988   Roudeski
(Continued)

FOREIGN PATENT DOCUMENTS

GB         2385908 A  *  9/2003  .............. F21S 6/002

OTHER PUBLICATIONS

Lighting EVER, LE 8W Dimmable LED Desk Lamp, 7-Level Brightness, Touch Sensitive Control, Daylight White, Folding Table Lamps, Reading Lamps, Bedroom Lamps, retrieved on Nov. 19, 2015, retrieved from http://www.amazon.com/Dimmable-7-Level-Brightness-Sensitive-Daylight/dp/B00MHLIGCY, 7 pages.
(Continued)

*Primary Examiner* — Seokjin Kim
(74) *Attorney, Agent, or Firm* — Brian S. Steinberger; Law Offices of Brian S. Steinberger, P.A.

(57) ABSTRACT

Switches, devices, systems, and methods for using a conductive pull chain on an overhead light where physically touching the chain can turn on and off the light as well as provides dimming levels of the overhead light, and for converting overhead light fixtures to have a pull chain that can become touch sensitive to turn on and off and have different light dimming levels. The pull chains can also be consecutively pulled to different brightness levels with three switch controls. The overhead lights can be wall mounted lights, ceiling mounted lights and/or ceiling fans with light fixtures.

13 Claims, 9 Drawing Sheets

Related U.S. Application Data

(60) Provisional application No. 62/236,383, filed on Oct. 2, 2015.

(51) Int. Cl.
  *F21S 8/00* (2006.01)
  *F21S 8/04* (2006.01)
  *F21V 33/00* (2006.01)
  *H05B 39/08* (2006.01)

(52) U.S. Cl.
  CPC ..... *F21V 33/0096* (2013.01); *H05B 37/0227* (2013.01); *H05B 39/08* (2013.01)

(58) Field of Classification Search
  CPC .............. H05B 33/0863; H05B 39/041; F21V 23/0485; F21V 33/0096; F21V 23/04; F21V 23/0442; F21S 8/03; F21S 8/04
  See application file for complete search history.

(56) References Cited

U.S. PATENT DOCUMENTS

| | | | |
|---|---|---|---|
| RE33,285 E | | 7/1990 | Kunen |
| 6,315,431 B1* | | 11/2001 | Greedy ................ F04D 25/088 |
| | | | 362/205 |
| 6,355,885 B1* | | 3/2002 | Rintz ...................... H01H 9/18 |
| | | | 174/66 |
| 9,506,640 B1 | | 11/2016 | Burns |
| 2002/0159267 A1 | | 10/2002 | Hao |
| 2004/0065532 A1* | | 4/2004 | Wei ...................... H03K 17/941 |
| | | | 200/33 C |
| 2004/0264187 A1* | | 12/2004 | Vanderschuit .......... F21S 6/005 |
| | | | 362/235 |
| 2005/0115814 A1* | | 6/2005 | Wei ...................... H03K 17/941 |
| | | | 200/331 |
| 2009/0231167 A1* | | 9/2009 | Chen .................... H03K 17/962 |
| | | | 341/22 |
| 2012/0188172 A1 | | 7/2012 | Fong |
| 2013/0038219 A1* | | 2/2013 | Dau .................... H05B 33/0845 |
| | | | 315/151 |
| 2015/0028776 A1 | | 1/2015 | McMillan |

OTHER PUBLICATIONS

General Electric, GE 18259 Touch Lamp Control, 3-Level Dimming for Use with Metal Socket Lamp, retrieved on Nov. 19, 2015, retrieved from http://www.amazon.com/GE-18259-Control-3-Level-Dimming/dp/B002DNAH78/ref=cm+cr+pr+product_top?ie=UTF8, 5 pages.

AmerTac, Westek 6000BC 200W Touch Lamp On/Off Plug-In Control, retrieved on Nov. 19, 2015, retrieved from http://www.amazon.com/AmerTac-6000BC-Touch-Plug-Control/dp/B001C1GQCM/ref=sr_1_2?=hi&ie=UTF8&qid=1447946942&sr=1-2&keywords=westek+plug-in+on%2Foff+control, 7 pages.

AmerTac, Westek 6503HBLC 300-Watt Touch Dimmer Replacement Kit, retrieved on Nov. 19, 2015, retrieved from http://www.amazon.com/Westek-6503HBLC-300-Watt-Dimmer-Replacement/dp/B000Z9819S, 6 pages.

* cited by examiner

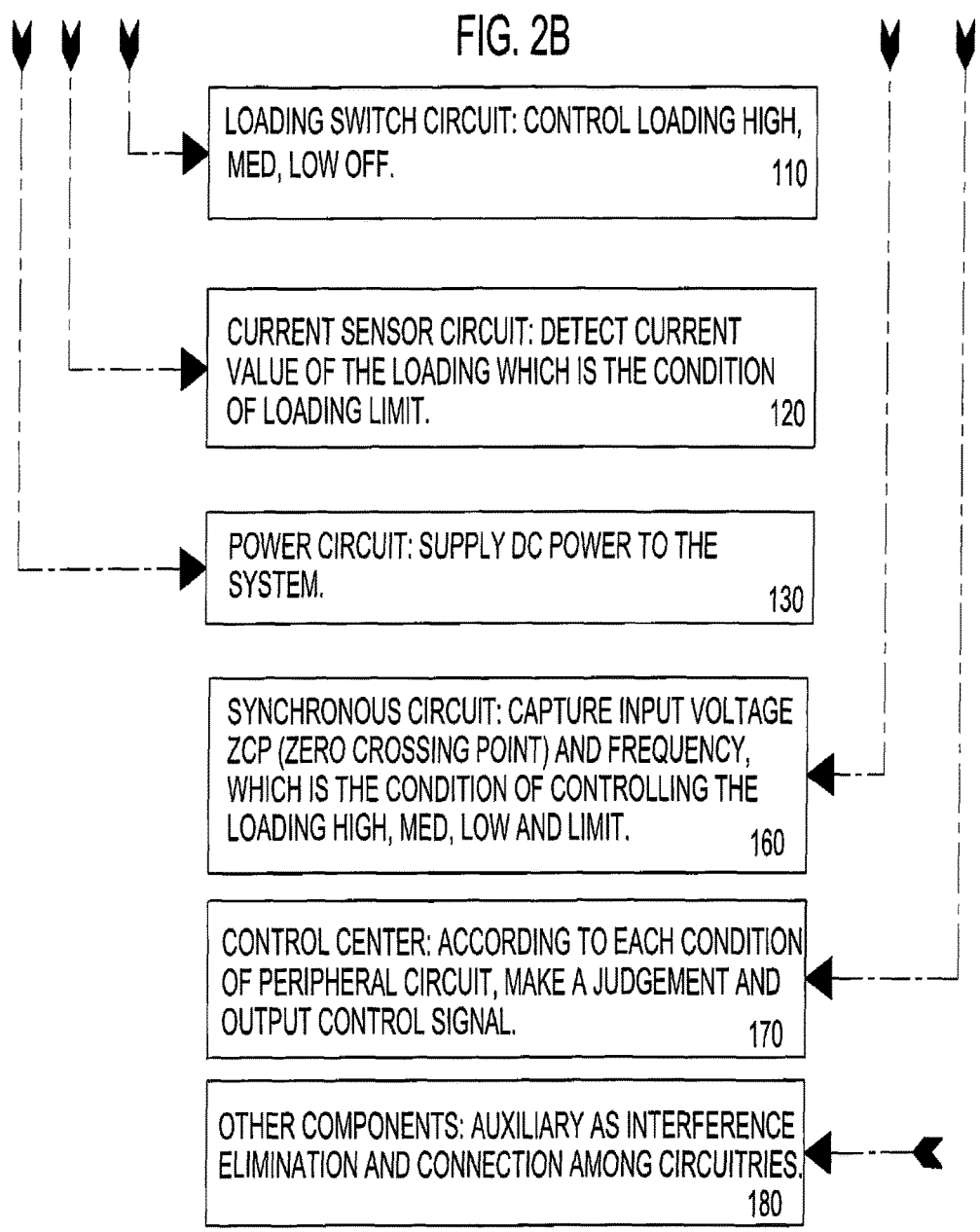

CONDUCTIVE CHAIN FOR TOUCH DIMMING OVERHEAD LIGHTS

CROSS REFERENCE TO RELATED APPLICATION

This application is a Continuation of U.S. patent application Ser. No. 14/966,872 filed Dec. 11, 2105, now U.S. Pat. No. 9,506,640, which claims the benefit of priority to U.S. Provisional Application Ser. No. 62/236,383 filed Oct. 2, 2015. The entire disclosure of each of the applications listed in this paragraph are incorporated herein by specific reference thereto.

FIELD OF INVENTION

This invention relates to light fixtures, and in particular to switches, devices, systems, and methods for using a pull chain on an overhead light where physically touching a conductive chain can control turning on and off the light as well as provide dimming levels of the overhead light, and for converting overhead light fixtures to have a pull chain that can become touch sensitive to different light dimming levels.

BACKGROUND AND PRIOR ART

Ceiling and wall mounted lights have used mechanical pull chains which require the user to physically pull on the chain to turn a mechanical spring biased switch in the fixture on and off. However, there are problems with these chains.

The mechanical pull chains on these raised light fixtures have problems with the internal components of the mechanical switch wearing out and becoming less reliable or failing entirely. The mechanical pull chain switch uses springs and contactors to switch from on too low to medium to high to off. Mechanical pull chain switches don't work well because they rely on mechanical system components that wear out over time. The springs in the mechanical pull chain switches lose strength and weaken over time. Additionally, the contact points in the mechanical pull chain switches become warped or burnt and eventually will not function properly.

These mechanical type pull chain switches are also problematic to operate for people with lessened dexterity in their hands, such as the elderly and the like. As such selected people are not able to reach, grab, hold and even pull the chains.

Dimming controls for lamps have been used over the years. See for example, U.S. Pat. No. 4,668,876 to Skarman; U.S. Pat. No. 4,764,708 to Roudeski; Reissued Pat. Re. 33,285 to Kunen, and U.S. Patent Application Publication 2002/0159267 to Hao. However, these devices are limited to surfaces that are primary on tabletop lamp bases. As such, this technology would not be practical and useful for wall mounted lamps and especially on overhead lamps which are generally out of reach.

Other types of dimming controls for overhead lights have been proposed over the years such as remote controls for ceiling fans having light fixtures. However, remote controls have additional problems. For example, the battery power supply in a remote control runs out of power after a period of time, and requires either battery replacement or recharging the battery.

Thus, the need exists for solutions to the above problems with the prior art.

SUMMARY OF THE INVENTION

A primary objective of the present invention is to provide switches, devices, systems, and methods of using an overhead light pull chain turn on and off, and dim the lights by physically touching the chain, where the touch on/off/dimming light fixture changes the switching mechanism to an electrical switch which is controlled by a circuit board that senses human skin touch.

A secondary objective of the present invention is to provide switches, devices, systems, and methods for using a pull chain on an overhead light where physically touching the chain controls dimming levels of the overhead light.

A secondary objective of the present invention is to provide switches, devices, systems, and methods for converting overhead light fixtures having pull chains so that the pull chain becomes touch sensitive to different light dimming levels.

A third objective of the present invention is to provide switches, devices, systems, and methods for using an overhead light pull chain where touching the chain controls dimming levels of the overhead light so that the touch dimming control removes the three position pull switch which frequently fails due to internal failure or chain breakage and 2. It allows people with loss of dexterity in their hands to easily control their light fixture.

A fourth objective of the present invention is to provide switches, devices, systems, and methods for using an overhead light pull chain where touching the chain controls dimming levels of the overhead light which allows people with loss of dexterity in their hands, such as the elderly and infirm to easily control their light fixture.

The touch on/off/dimming feature of our light system solves two problems—1. it removes the three position pull switch which frequently fails due to internal failure or chain breakage and 2. it allows people with loss of dexterity in their hands to easily control their light fixture. The invention claimed here solves this problem.

The on/off/dimming light fixture functions by sensing human touch which controls an internal electrical switching mechanism. It removes the need to grasp and pull the chain to cause a mechanical switch to function.

The on/off/dimming touch light fixture uses electronic capacitance sensing to sense when the chain is touched by human skin. The function of the light fixture is controlled by electrical switches rather than antiquated mechanical switches.

This invention is an improvement on what currently exists. The on/off/dimming touch light fixture uses electronic capacitance sensing to sense when the chain is touched by human skin. The function of the light fixture is controlled by electrical switches rather than antiquated mechanical switches.

The touch on/off/dimming light fixture changes the switching mechanism to an electrical switch which is controlled by a circuit board that senses human skin touch.

Further objects and advantages of this invention will be apparent from the following detailed description of the presently preferred embodiments which are illustrated schematically in the accompanying drawings.

BRIEF DESCRIPTION OF THE FIGURES

FIGS. 2A, 2B, 2C shows a schematic diagram with the loading switch circuit, current sensor circuit and power circuit and touch circuit control used with the fixture of FIG. 1.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figure 1:
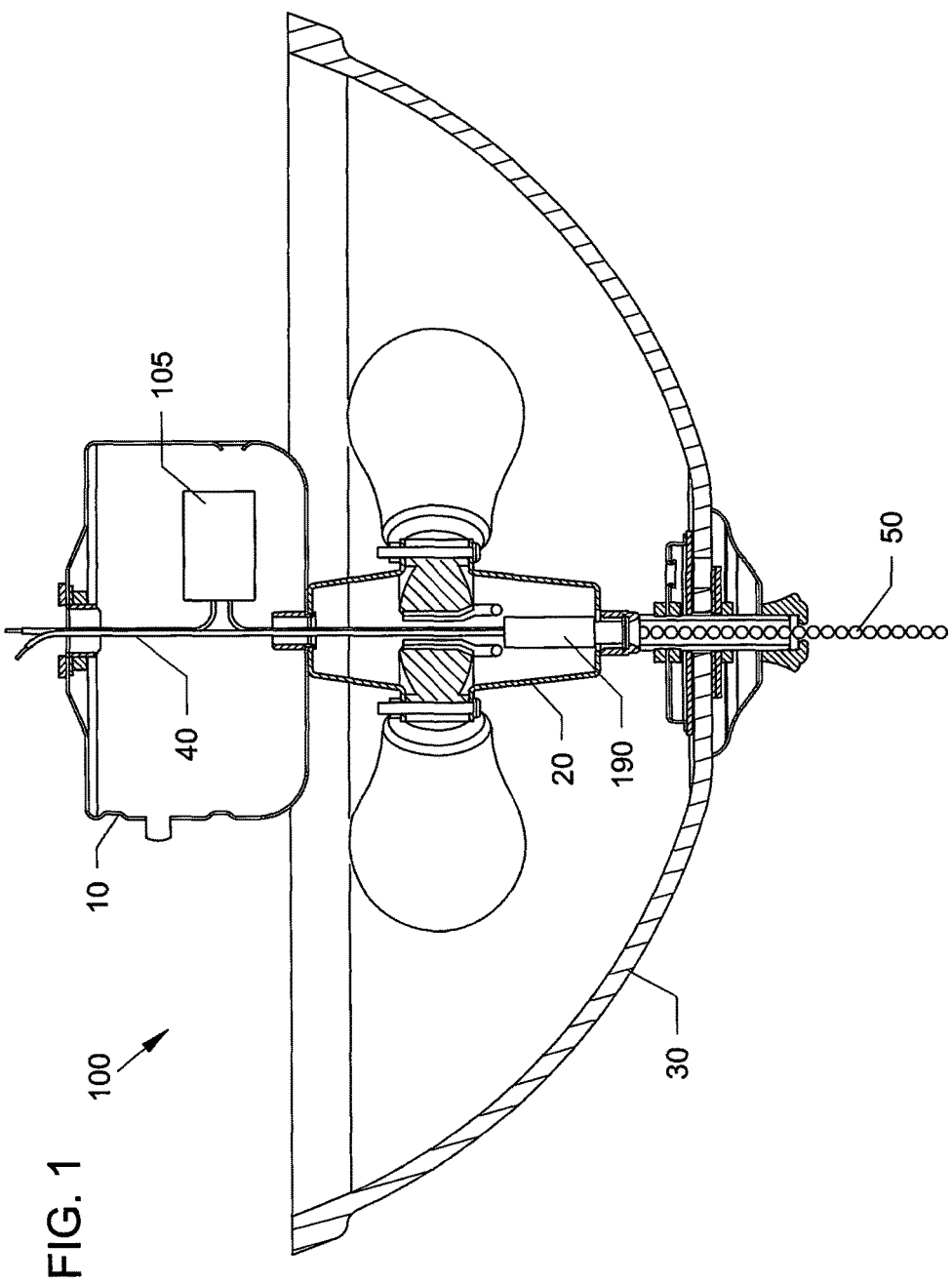
FIG. 1 is a cross-sectional view of a first embodiment ceiling mounted light fixture with touch dimming only control conductive chain.

A list of components will now be described.
10 Light fixture housing
20 Light socket assembly
30 Glass light diffuser
40 Wires from power supply and to ceiling fan
50 conductive pull chain
100 touch dimming only control chain embodiment
105 circuit board for first embodiment
110 loading switch circuit
120 current sensor circuit
130 power circuit
140 touch circuit
160 synchronous circuit
170 control center
180 other circuitry
190 voltage regulator
200 pulling chain with touch dimming control chain embodiment
205 circuit board for second embodiment
240 low voltage wire from switch 295 to regulator 290
250 pull chain detection circuit
290 electronic regulator
295 light switch
300 Continuous holding of conductive pull chain to change dimming embodiment
390 voltage regulator
400 Pull chain as a three step switch embodiment
442 wires to fan
446 jumper to switch
450 three step light switch
460 pull chain
490 electronic regulator FIG. 1 is a cross-sectional view of a first embodiment ceiling mounted light fixture 100 with touch dimming only control conductive chain 50. The light fixture housing 10 can be mounted to an existing electrical box in a ceiling. Wires 40 can be used for supplying power to the light fixture 20 having light sources (such as but not limited to fluorescent bulbs, LEDs, light emitting diodes, and any other type of dimmable light sources, as well as supply power to a ceiling fan that can be used with the light fixture 20. A light diffuser 30 such as a translucent light shade can be attached to the light fixture 20. Inside the housing 10 can be circuit board 105 attached to the conductive pull chain 50 through a voltage regulator 190.

Figure 2A:
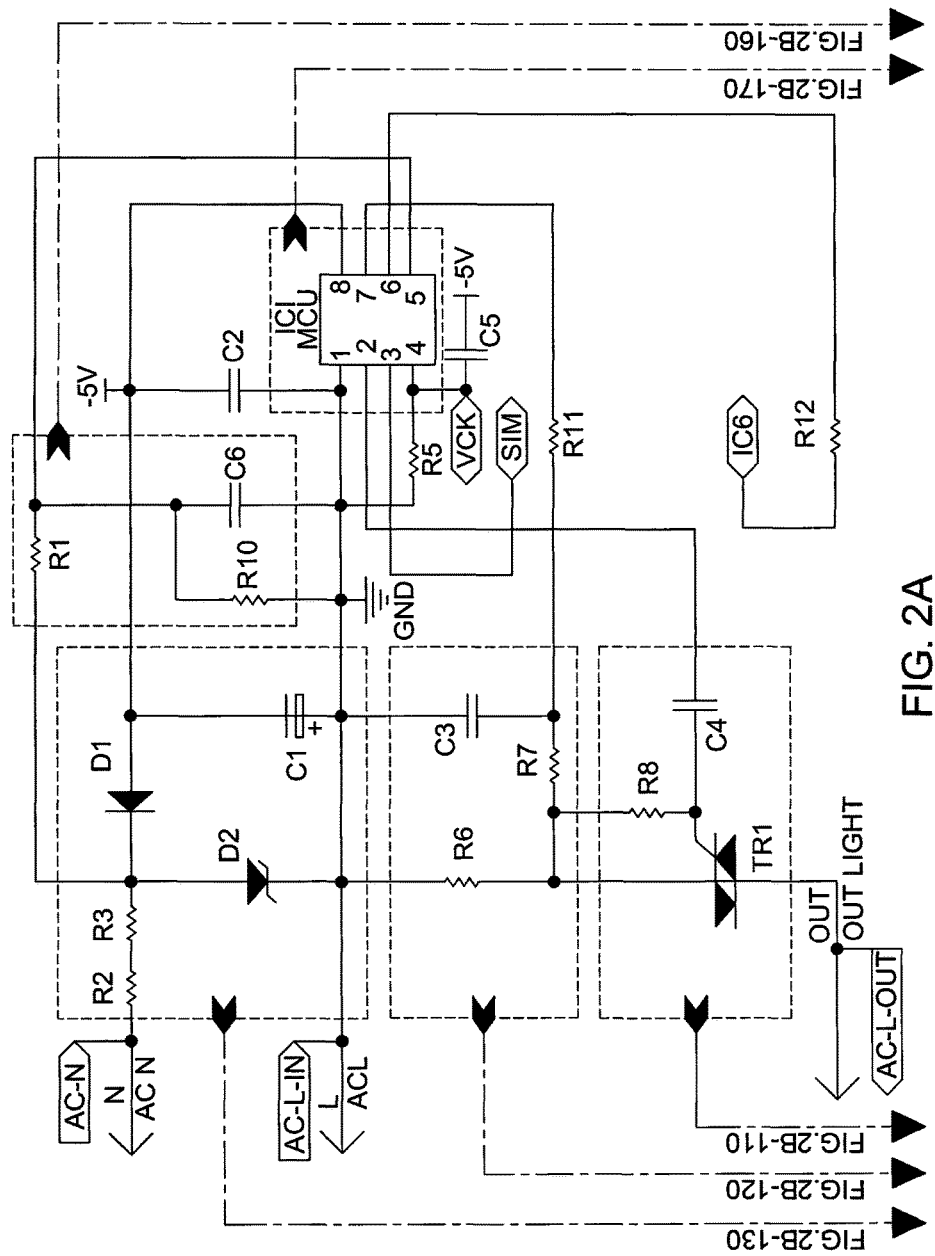
Figure 2C:
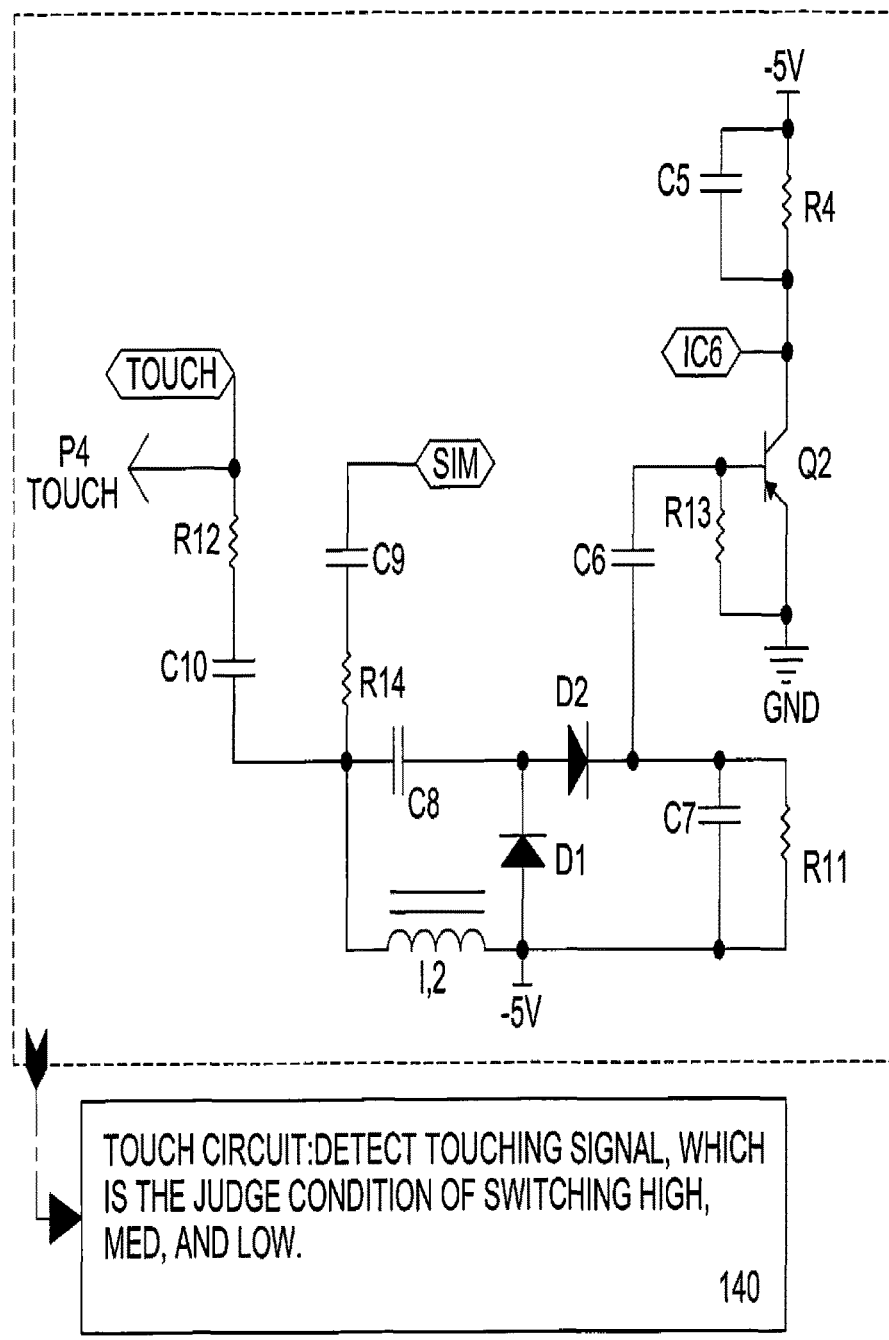

FIG. 2 is a schematic diagram with the loading switch circuit 110, current sensor circuit 120, power circuit 130, synchronous circuit 160, control center circuit 170, other circuit 180 and touch control circuit 140 used with the fixture 100 of FIG. 1.

Referring to FIGS. 1-2, the circuit board 105 contains the power circuit 130 which converts 120 VAC electrical input to DC output to power the other circuits. The synchronous circuit 160 captures the input voltage ZCP (Zero Crossing Point) and frequency which is the condition of controlling the loading high, medium, low and limit.

The current sensor circuit 120 can detect current value of the loading which is the condition of the loading limit. The loading switch circuit 110 controls loading high, medium, low, off and limit. The other electrical circuitry 180 auxiliary as interference elimination and connection among other circuits. Other circuitry can include components in the ceiling fan required for the fan's operation such as capacitors and switches.

The conductive control chain 50 can be formed from a conductive strand, conductive chain and the like. For example, aluminum has been shown to be highly conductive. Brass has been tested as a stronger material, and other metals, such as but not limited to steel, and the like, can be used. Additionally, the pull chain can be formed from precious metals, such as but not limited to silver and gold.

In addition to using conductive metal materials, the invention can also work with a metal coating over a nonconductive material, such as plastic strands, cotton strands, and the like.

The conductive chain 50 can have a preferable length of approximately 18 inches to 24 inches, and up to approximately 36 inches if the sensor circuitry is very sensitive. Capacitance is measured in pico farads (pF). The subject invention control operates between 1 pF and 30 pF and values that can be sensed.

The conductive chain 50 allows for current sensing impulses to be detected by the sensor circuit 120.

The control center circuit 170 accepts inputs from loading switch circuit 110, current sensor circuit 120, touch circuit 140 to make judgment as to output current to light socket assembly 20.

The Touch Circuit 140 receives the signal from the consumer's touch on the chain. It then transmits a signal to the Synchronous Circuit 160 which adjusts the voltage waveform to smoothly reduce the brightness of the light bulbs. At the same time the Control Center 170 also receives input from the Touch Circuit 140. It transmits the setting command to the Synchronous Circuit 160, ensuring the correct setting is reached. The circuit board 105 contains all of the circuits 110 to 180.

The Voltage Regulator 190 is a combination of the common on/off pull chain switch and the Circuits of 105.

Referring to FIGS. 1-2, the power circuit 130 senses when power is applied (such as when a wall switch is turned), and converts the AC power to DC power to control the circuit board 105. When power is applied to the circuit board 105, the control center 170 sets the current output from the last setting of off, low, medium or high to the next setting.

When the conductive pull chain 50 is touched by a human, the control center 170 senses the touch and checks the loading switch circuit 110 to determine the current load (output), which then sends the signal to the loading switch circuit 110 move the output power up to the next preset level and change the power going to the light socket assembly 20. The synchronous circuit 160 monitors power input from the power circuit 130 and power output from the loading switch circuit 110 and frequency across the control center 170 to maintain a steady power supply. The other electrical circuitry 180 can filter incoming power supply to prevent damaging power spikes, interference with other fan and light components and connects all circuits to the control center 170.

The touch dimming only chain embodiment fixture 100 can be installed as a ceiling mounted light fixture. The user can touch the conductive pull chain 50 to operate the light fixture 20 instead of pulling the pull chain to operate the light fixture 20. Touching the conductive pull chain 50 will turn the fixture from off to low. Touching the pull chain 50 again will switch the light output from low to medium. Touching the conductive pull chain 50 again will switch the light output from medium to high. Touching the conductive pull chain 50 a fourth time will switch the light output from high to off. The cycle can then begin again.

The touch dimmer embodiment can function as a three step dimming level switch. Touching the conductive chain 50 once allows the light to be on a maximum brightness. A second touch of the conductive chain 50 can change the light output to a medium brightness setting, such as approximately 60% brightness. A third touch of the conductive chain 50, can drop the light brightness to a low setting such as approximately 20% brightness. A fourth touch of the conductive chain 50 can turn the light off.

In this embodiment only the chain 50 and fan dangle can be touch sensitive. The fan dangle can be a decorative element attached to the end of the chain. In the touch dimming assembly, the fan dangle's weight helps to stabilize the connection between the links in the chain.

Pulling Chain with Touch Dimming Control Conductive Chain

Figure 3:
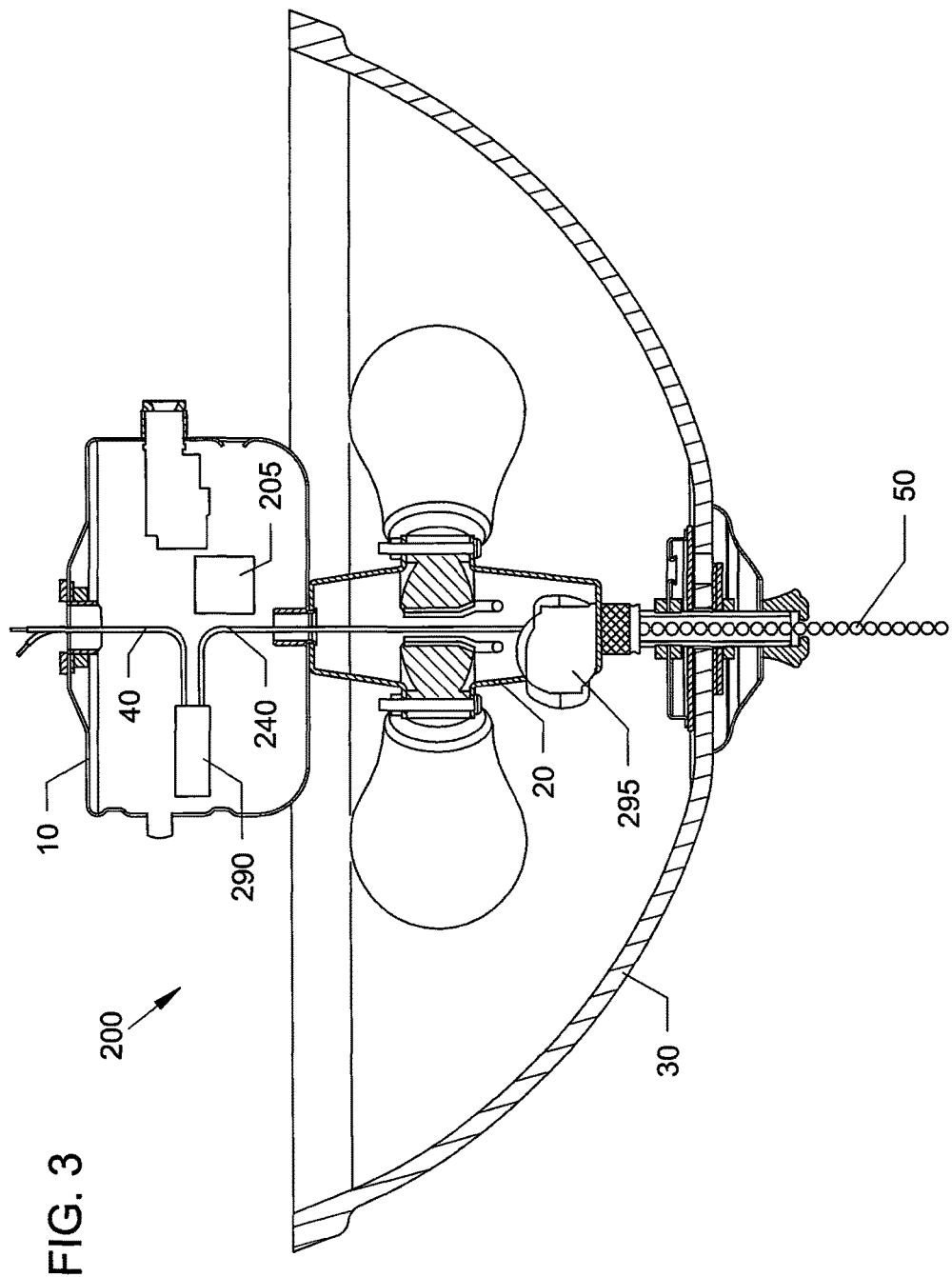
FIG. 3 is a cross-sectional view of a second embodiment ceiling mounted light fixture which combines pulling the conductive chain to turn the light on and off, with the touch control chain to change dimming levels of the light.

FIG. 3 is a cross-sectional view of a second embodiment ceiling mounted light fixture embodiment 200 which combines pulling the conductive chain 50 to turn the light on and off, with the conductive control chain 50 being able to be separately touched to change dimming levels of the light. The fixture embodiment 200 includes similar housing 10, light socket assembly 20, wires 40 from power supply to fixture 20 and to a ceiling fan, and conductive pull chain 50 as in the first embodiment. Embodiment 200 further includes an electronic regulator 90 light switch 295 and wire 240 from the regulator 290 to the light switch 295.

The electronic regulator 290 can be component 105 in the previous embodiment. Light switch 295 can be an on and off switch that can be activated by pulling chain 50

Figure 4A:
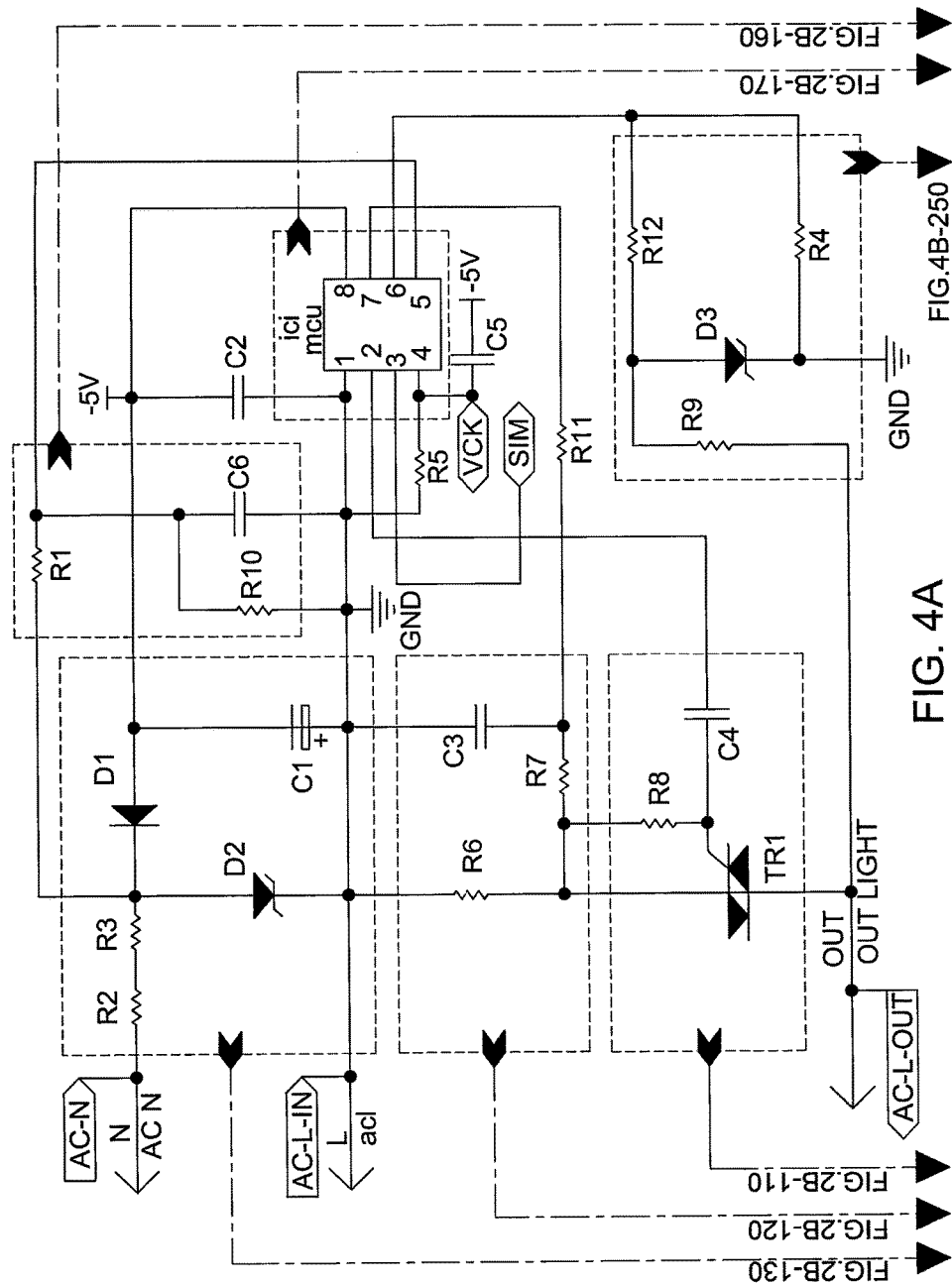
FIGS. 4A-4B shows a schematic diagram with the loading switch, current sensor switch, power circuit and pull chain detection circuit used in the fixture of FIG. 3.
Figure 4B:
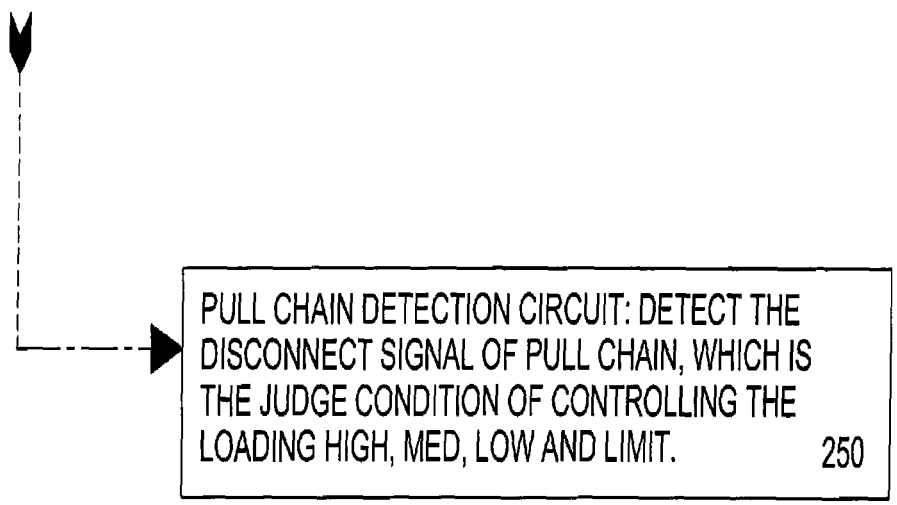

FIG. 4 is a schematic diagram with the loading switch circuit 110, current sensor circuit 120, power circuit 130, synchronous circuit 160, control center circuit 170, other circuits 180, and pull chain detection circuit 250 used in the fixture of FIG. 3.

Referring to FIGS. 3-4, this embodiment 200 works similar to the conductive chain 50 dimming control only embodiment 100 previously described, with the exception of adding a pull chain detection circuit 250. Circuit board 205 can include the circuits 110, 120, 130, 140, 160, 170 and 180.

Power to the light socket assembly 20 is initially controlled by pulling the conductive chain 50 which activates power on and off through the light switch 295. This embodiment can operate by the user pulling the conductive chain 50 once to turn on the light, and a second pull on the conductive chain can turn the light off.

Once the light is turned on, the conductive chain 50 can be operable, the pull chain detection circuit 250 detects the disconnect signal of the pull chain 50 which is the judge condition of controlling the loading high, medium, low and limit based on capacitive input from the conductive pull chain 50.

The control center circuit 170 accepts inputs from loading switch circuit 110, current sensor circuit 120, pull chain detection circuit 250 and synchronous circuit 160 to make judgment as to output current to light socket assembly 20. The rest of the circuits 110, 130, 140, 170 and 180 function similar to the circuits in the previous embodiment.

Once the conductive pull chain 50 has been pulled to turn on the lights, the touch dimmer part of the second embodiment is operable. Touching the conductive chain 50 once, can turn the light on maximum brightness. A second touch, can turn the light at a medium (approximately 60% brightness level), touching the conductive chain 50 a third time, can drop the brightness of the light to approximately 20% bright. The overall construction is the same as embodiments 1 and 2. The infinite dimming can be applied to either of the previous embodiments.

Continuous Holding of Conductive Chain to Control Dimming

Figure 5:
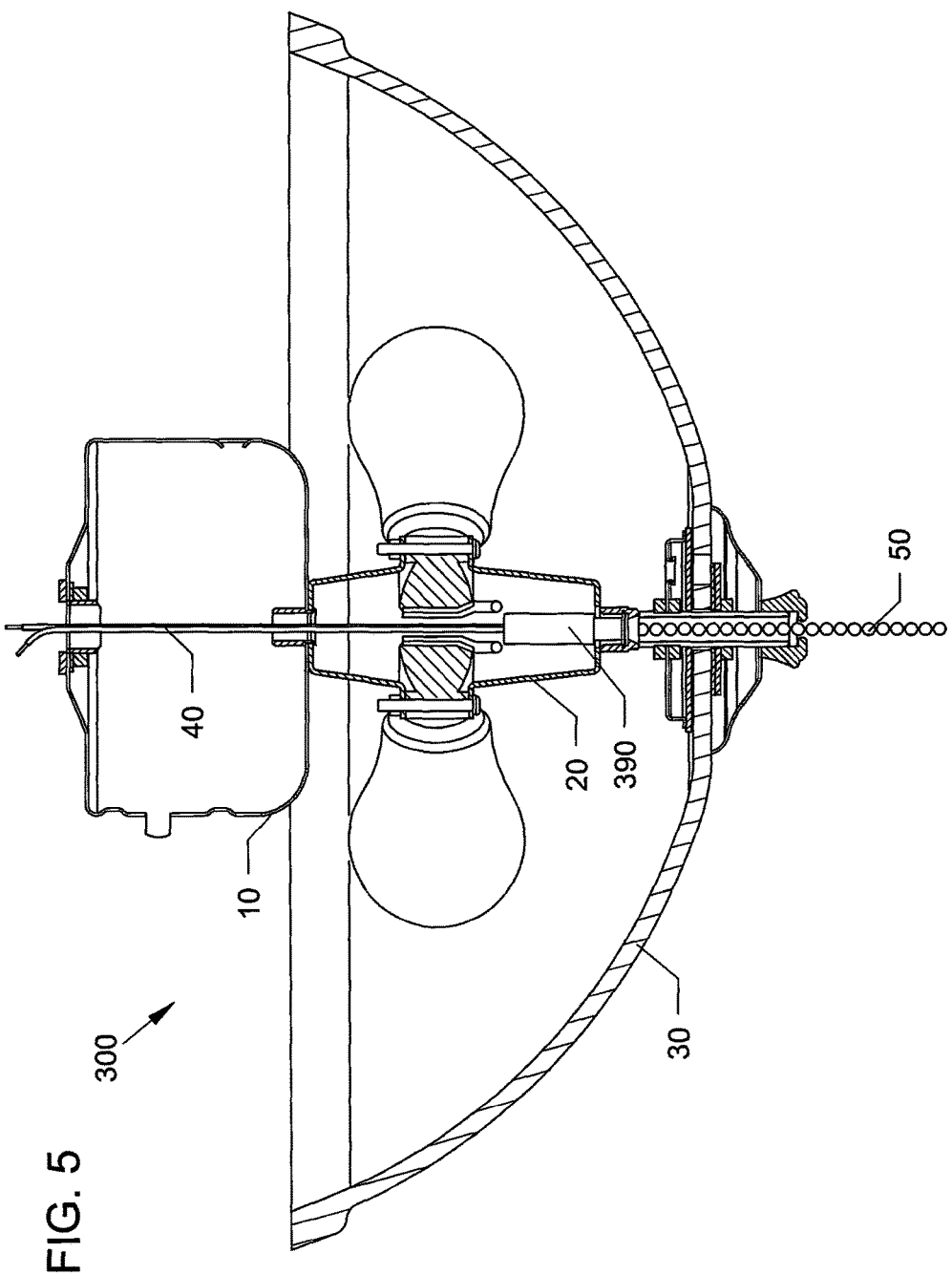
FIG. 5 is a cross-sectional view of a fourth embodiment ceiling mounted light fixture which uses continuous holding of the pull chain to change dimming levels of the light.

FIG. 5 is a cross-sectional view of a fourth embodiment ceiling mounted light fixture 300 which uses continuous holding of the pull chain to change dimming levels of the light.

The programming added to the Control Center 170 measures the length of time the consumer holds the chain. The longer the chain is held, the further the light dims. The light will dim to the minimum setting (10%) then cycle back up to maximum (100%). On and off are still controlled by a quick touch of the chain.

The infinite touch dimming embodiment 300 can use circuits used in the first embodiment. The voltage regulator here can be include but is not limited to an existing press and hold dimming control used on remote controls.

The touch dimmer embodiment 300 functions as full range light dimmer. The user can physically press and hold the conductive chain 50 or fan dangle part, and the light turns on at a maximum brightness. As the user holds the conductive chain, the light begins to reduce brightness after approximately 2 to approximately 3 seconds. The longer the conductive chain 50 is held the dimmer the light becomes (similar to a rheostat switch). Once the lowest setting is reached (approximately 10% light output), the light begins to increase in brightness.

The user can let go of the conductive chain at the desired brightness level of the light. A tap, touch or pinch of the chain or fan dangle can turn the light off. Additionally, a tap, touch or pinch of the chain or dangle can turn the light on to the last brightness level to user has adjusted the light source brightness to.

In this embodiment, the chain 50 or the chain and fan dangle can be touch sensitive (conductive).

The chain is critical to the functionality. The fan dangle will conduct if it is metallic or coated in a metallic finish. But the fan dangle is optional. Accessory fan dangles (sold at many retailers) can be used with the touch dimming light kit.

Three Step Pulling Chain to Control Dimming

Figure 6:
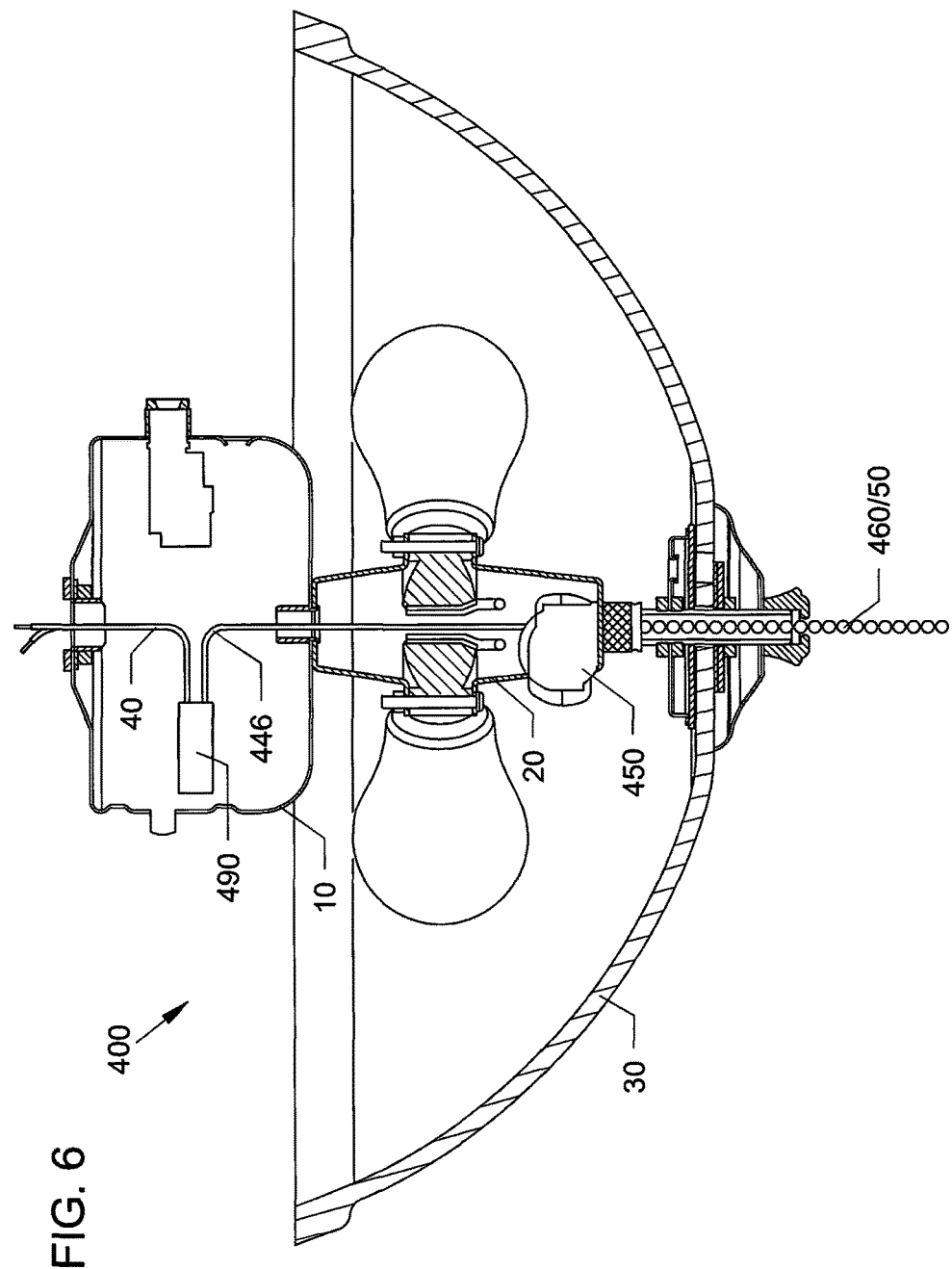
FIG. 6 is a cross-sectional view of a third embodiment ceiling mounted light fixture which uses the pull chain as a three step switch to control to turn the light on and off as well as control dimming levels of the light.

FIG. 6 is a cross-sectional view of a third embodiment ceiling mounted light fixture 400 which uses the pull chain 460 as a three step (low, medium, high and off) switch to control to turn the light on and off as well as control dimming levels of the light.

The three step switch 450 can be a common pull chain that can be pulled into three different settings that correspond to high, medium, low and off settings. The electronic regulator only limits the light kit to a total of 190 watts of electricity The regulator 490 measures the incoming current and limits the light to a total of 190 watts. The jumper to the switch provides current between regulator 190, the light bulb assembly 20 and the switch.

Referring to FIG. 6, the pull chain 460 can be a chain such as the conductive chain 50 previously described, or a non-conductive chain.

The pull chain 460 can function as a three step switch. Pulling the chain 460 once and the light can turn on to maximum brightness. A second pull on the chain 460 can reduce the light output to medium intensity (approximately 60% brightness). A third pull on the chain 460 can reduce the light to a low brightness (approximately 10% brightness. A fourth pull on the chain 460 can turn the light off.

The term "approximately" can be +/−5% of the amount referenced. Additionally, preferred amounts and ranges can include the amounts and ranges referenced without the prefix of being approximately.

The invention can be manufactured with the light fixtures at the factory. In addition, the invention can be in kit forms for allowing users and others to retrofit existing light fixtures with pull chains to have dimming control levels.

While the embodiments are described with controlling dimming levels of lights, the invention, each of the embodiments can also be used with pull chains for controlling ceiling fan rotational speeds, on and off positions, combinations thereof, and the like.

Although the embodiments describe the invention embodiments as being mounted to a ceiling light power supply, the invention can be used with wall mounted fixtures having pull chains, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A light fixture dimming control system, consisting of:
a light fixture having a light source;
a dimming switch control that includes an electronic capacitance sensor, connected to the light source without a mechanical pull switch; and
a conductive elongated strand having an upper end attached to the dimming switch control, and a lower free end with all of the conductive strand between the upper end and the lower free end being only touch sensitive to operate the switch control, wherein dimming of the light source is controlled by adapting physical contact with the conductive elongated strand without pulling the strand, the switch control having three step dimming levels with a first touch setting for turning the light source from an off position to a maximum brightness level, a second touch setting for turning the light source from the maximum brightness level to a medium brightness level, a third touch setting for turning the light source from the medium brightness level to a low brightness level, and a fourth touch setting for turning the low brightness level to the off position.

2. The light fixture dimming control system of claim 1, wherein the light fixture is a wall mounted light fixture.

3. The light fixture dimming control system of claim 1, wherein the light fixture is a ceiling mounted light fixture.

4. The light fixture dimming control system of claim 1, wherein the light fixture is attached to a ceiling fan.

5. The light fixture dimming control system of claim 1, wherein the medium brightness level is approximately 60% of the maximum brightness level, and the low brightness level is approximately 20% of the maximum brightness level.

6. A method of dimming lights with a conductive line without pulling the line, consisting of the steps of:
providing a light fixture connected to a light source;
providing an electronic capacitance sensor as a dimming switch control in the light fixture without a mechanical pull switch;
providing a conductive elongated strand having an upper end attached to the switch control in the light fixture, and a lower hanging free end with or without a dangle;
mounting the light fixture in an overhead location; and
controlling dimming of the light source by adapting physical contact with the lower end of the conductive elongated strand without pulling the strand, wherein only the strand with or without the dangle is touch sensitive to operate the dimming switch control; and
providing three step dimming levels with a first touch setting for turning the light source from an off position to a maximum brightness level, a second touch setting for turning the light source from the maximum brightness to a medium brightness level, a third touch setting for turning the light source from the medium brightness level to a low brightness level, and a fourth touch setting for turning the low brightness level to the off position.

7. The method of claim 6, wherein the step of mounting the light fixture includes the step of mounting the light fixture to a wall.

8. The method of claim 6, wherein the step of mounting the light fixture includes the step of mounting the light fixture to a ceiling.

9. The method of claim 6, wherein the step of mounting the light fixture includes the step of mounting the light fixture to a ceiling fan.

10. The method of claim 6, wherein the step of providing the three step dimming levels includes the medium brightness level is approximately 60% of the maximum brightness level, and the low brightness level is approximately 20% of the maximum brightness level.

11. A light dimming control system, consisting of:
a light source;
a dimming switch control connected to the light source, without a mechanical pull switch; and
a conductive elongated strand having an upper end attached to the switch control, and a lower free end and a dangle, with all of the conductive strand between the upper end and the lower free end and the dangle being only touch sensitive to operate the dimming switch control, wherein dimming of the light source is controlled by adapting physical contact with the conductive elongated strand without pulling the strand, the switch control having a plurality of dimming levels with different touch settings for operating the light source between different brightness levels.

12. The light dimming control system of claim 11, wherein the plurality of dimming levels with different touch settings include:
three step dimming levels with a first touch setting for turning the light source from an off position to a maximum brightness level, a second touch setting for turning the light source from the maximum brightness level to a medium brightness level, a third touch setting for turning the light source from the medium brightness level to a low brightness level, and a fourth touch setting for turning the low brightness level to the off position.

13. The light dimming control system of claim 12, wherein the medium brightness level is approximately 60% of the maximum brightness level, and the low brightness level is approximately 20% of the maximum brightness level.

* * * * *